United States Patent
Makijima et al.

(10) Patent No.: US 11,568,866 B2
(45) Date of Patent: Jan. 31, 2023

(54) AUDIO PROCESSING SYSTEM, CONFERENCING SYSTEM, AND AUDIO PROCESSING METHOD

(71) Applicant: SHARP KABUSHIKI KAISHA, Sakai (JP)

(72) Inventors: Kazuo Makijima, Sakai (JP); Satoshi Terada, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 197 days.

(21) Appl. No.: 16/874,201

(22) Filed: May 14, 2020

(65) Prior Publication Data

US 2020/0388279 A1  Dec. 10, 2020

(30) Foreign Application Priority Data

Jun. 5, 2019  (JP) .............................. JP2019-105188

(51) Int. Cl.
*G10L 15/22* (2006.01)
*G10L 15/08* (2006.01)
*G06F 3/16* (2006.01)

(52) U.S. Cl.
CPC .............. *G10L 15/22* (2013.01); *G06F 3/167* (2013.01); *G10L 15/08* (2013.01); *G10L 2015/088* (2013.01); *G10L 2015/223* (2013.01)

(58) Field of Classification Search
CPC ......... G10L 15/22; G10L 15/00; G10L 15/01; G10L 15/06; G10L 15/063; G10L 15/065; G10L 15/08; G10L 15/183; G10L 15/20; G10L 15/24; G10L 15/26; G10L 15/30; G10L 2015/0631–0638; G10L 2015/221–228

USPC .... 704/275, 270.1, 270, 231, 235, 243, 246, 704/250, 251, 255
See application file for complete search history.

(56) References Cited

U.S. PATENT DOCUMENTS

| | | | |
|---|---|---|---|
| 2004/0227811 A1 | 11/2004 | Yoneda | |
| 2007/0120966 A1* | 5/2007 | Murai | H04N 7/15 348/E7.083 |
| 2009/0070434 A1* | 3/2009 | Himmelstein | G06Q 30/0239 709/217 |
| 2018/0351895 A1* | 12/2018 | Rathod | H04L 51/32 |
| 2019/0251961 A1* | 8/2019 | Wang | G10L 15/1815 |
| 2019/0371304 A1* | 12/2019 | Fritz | G10L 15/1822 |

FOREIGN PATENT DOCUMENTS

JP   2004-343232 A   12/2004

* cited by examiner

*Primary Examiner* — Qi Han
(74) *Attorney, Agent, or Firm* — ScienBiziP, P.C.

(57) ABSTRACT

An audio processing system includes: an audio receiver that receives audio; a speaker specifier that specifies a speaker on the basis of the received audio; an audio determinator that determines, on the basis of the received audio, whether or not a specified word for starting the reception of a predetermined command is included in the audio; a command specifier that specifies, when the specified word is included in the audio, a command on the basis of a command keyword which is included in the audio and follows the specified word; a target user specifier that specifies, on the basis of the content of the command, a target user with respect to which the command is to be executed; and a command executor that executes the command with respect to the target user.

9 Claims, 12 Drawing Sheets

FIG. 6
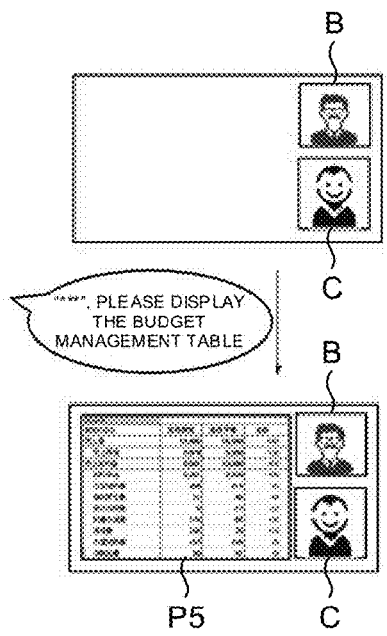
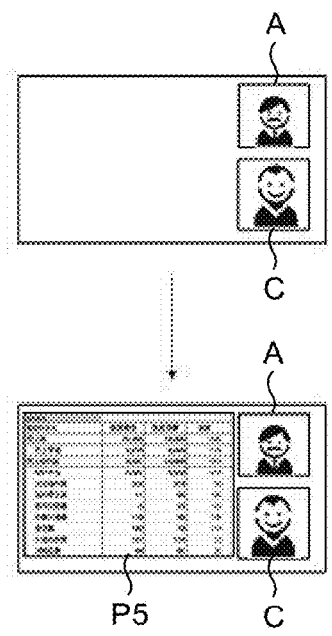
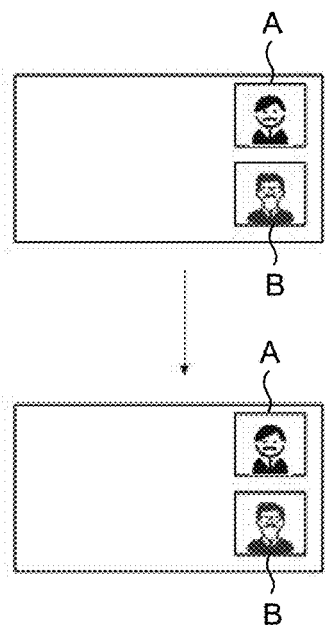

| CONFERENCE INFORMATION |||||||
|---|---|---|---|---|---|
| CONFERENCE ID | SUBJECT | START DATE AND TIME | END DATE AND TIME | ATTACHMENT FILE ID | PARTICIPANT ID |
| M001 | T1 | yyyy/mm/dd hh:mm | yyyy/mm/dd hh:mm | f001 | U001 |
| | | | | | U002 |
| | | | | | U003 |

| USER INFORMATION | | |
|---|---|---|
| USER ID | USER NAME | SCHEDULE ID |
| U001 | A | S001 |
| U002 | B | S002 |
| U003 | C | S003 |
| U004 | D | S004 |
| ... | ... | ... |

PARTICIPANT INFORMATION

| CONFERENCE ID | PARTICIPANT ID | PARTICIPANT NAME | DISPLAY DEVICE ID |
|---|---|---|---|
| M001 | U001 | A | D001 |
| | U002 | B | D002 |
| | U003 | C | D003 |

COMMAND INFORMATION

| KEYWORD | COMMAND | TARGET USER |
|---|---|---|
| PLEASE START THE CONFERENCE SCHEDULED FOR TODAY | START CONFERENCE | NONE |
| PLEASE DISPLAY HELP | DISPLAY HELP | SPEAKER |
| PLEASE DISPLAY THE ATTACHED FILE | DISPLAY ATTACHED FILE | ALL PARTICIPANTS |
| PLEASE TURN TO THE NEXT PAGE | PAGE FEED | PARTICIPANTS CURRENTLY DISPLAYING FILE |
| PLEASE DISPLAY "..." | DISPLAY SPECIFIED FILE | APPROVED PARTICIPANTS |
| PLEASE SHOW "..." MY SCHEDULE FOR THIS WEEK | DISPLAY SCHEDULE | SPECIFIED PARTICIPANTS |
| ... | ... | ... |

| CONTENT INFORMATION | | |
|---|---|---|
| CONTENT ID | CONTENT NAME | APPROVED USERS |
| C001 | BUDGET MANAGEMENT-TABLE | A、B |
| C002 | WEEKLY REPORT | A、C |
| C003 | PATENT DRAWINGS | A、B |
| ... | ... | ... |

AUDIO PROCESSING SYSTEM, CONFERENCING SYSTEM, AND AUDIO PROCESSING METHOD

This application is based upon and claims the benefit of priority from the corresponding Japanese Patent Application No. 2019-105188 filed on Jun. 5, 2019, the entire contents of which are incorporated herein by reference.

BACKGROUND OF THE INVENTION

Field of the Invention

The present disclosure relates to an audio processing system, a conferencing system, and an audio processing method.

Description of the Background Art

Conventionally, a conferencing system has been proposed that transmits and receives audio, video, files, and the like from separate locations via a network. For example, there is proposed an imaging unit that captures a camera image, and a videophone device that recognizes words in an input audio, such that when the input audio matches a registered keyword, a specific auxiliary image associated with a registered keyword is selected and transmission is switched between the camera image and the auxiliary image.

In the conventional technique, for example, when audio of a first user in a conference is recognized (audio command), information generated in response to the audio command (command response) is transmitted to all of the users participating in the conference. However, the command response represents information which is necessary to only some of the users, and in some cases the information is unnecessary to some of the other users. Consequently, it is difficult to perform information transmission in an appropriate manner in a system that transmits the command response to all of the users participating in the conference.

SUMMARY OF THE INVENTION

An object of the present disclosure is to provide an audio processing system, a conferencing system, and an audio processing method capable of appropriately transmitting to users the information generated in response to an audio command.

An audio processing system according to an aspect of the present disclosure includes: an audio receiver that receives audio; a speaker specifier that specifies a speaker on the basis of the audio received by the audio receiver; an audio determinator that determines, on the basis of the audio received by the audio receiver, whether or not a specified word for starting the reception of a predetermined command is included in the audio; a command specifier that specifies, when the audio determinator determines that the specified word is included in the audio, a command on the basis of a command keyword which is included in the audio and follows the specified word; a target user specifier that specifies, on the basis of the content of the command specified by the command specifier, a target user with respect to which the command is to be executed; and a command executor that executes the command specified by the command specifier with respect to the target user specified by the target user specifier.

A conferencing system according to another aspect of the present disclosure has an audio processing device and a display device placed in each area, and is capable of transmitting and receiving audio between the areas via the audio processing device, and includes: an audio receiver that receives audio; a speaker specifier that specifies a speaker on the basis of the audio received by the audio receiver; an audio determinator that determines, on the basis of the audio received by the audio receiver, whether or not a specified word for starting the reception of a predetermined command is included in the audio; a command specifier that specifies, when the audio determinator determines that the specified word is included in the audio, a command on the basis of a command keyword which is included in the audio and follows the specified word; a target user specifier that specifies, on the basis of the content of the command specified by the command specifier, a target user with respect to which the command is to be executed; and a command executor that executes the command specified by the command specifier with respect to the display device in the area in which the target user specified by the target user specifier is located.

An audio processing method according to another aspect of the present disclosure is executed by one or more processors, and includes: receiving audio; specifying a speaker on the basis of the received audio; determining, on the basis of the received audio, whether or not a specified word for starting the reception of a predetermined command is included in the audio; specifying, when it is determined that the specified word is included in the audio, a command on the basis of a command keyword which is included in the audio and follows the specified word; specifying, on the basis of the content of the specified command, a target user with respect to which the command is to be executed; and executing the specified command with respect to the specified target user.

An audio processing program according to another aspect of the present disclosure is an audio processing program for causing one or more processors to execute the steps of: receiving audio; specifying a speaker on the basis of the received audio; determining, on the basis of the received audio, whether or not a specified word for starting the reception of a predetermined command is included in the audio; specifying, when it is determined that the specified word is included in the audio, a command on the basis of a command keyword which is included in the audio and follows the specified word; specifying, on the basis of the content of the specified command, a target user with respect to which the command is to be executed; and executing the specified command with respect to the specified target user.

According to the present disclosure, an audio processing device, a conferencing system, an audio processing method, and an audio processing program are provided which are capable of appropriately transmitting to users the information generated in response to an audio command.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 6 is a diagram showing an example of a display screen displayed on a display device of a conferencing system according to an embodiment of the present disclosure.

FIG. 8 is a diagram showing an example of conference information used in a conferencing system according to an embodiment of the present disclosure.

FIG. 9 is a diagram showing an example of user information used in a conferencing system according to an embodiment of the present disclosure.

FIG. 10 is a diagram showing an example of participant information used in a conferencing system according to an embodiment of the present disclosure.

FIG. 11 is a diagram showing an example of command information used in a conferencing system according to an embodiment of the present disclosure.

FIG. 12 is a diagram showing an example of content information used in a conferencing system according to an embodiment of the present disclosure.

DESCRIPTION OF THE PREFERRED EMBODIMENTS

Hereinafter, an embodiment of the present disclosure will be described with reference to the accompanying drawings. The following embodiment represents an example of implementing the present disclosure, and does not limit the technical scope of the present disclosure.

The audio processing system according to the present disclosure can be applied to a conference in which a plurality of users participate from a single location (area), a remote conference in which a plurality of users participate via network connections from a plurality of locations (areas), or the like. Furthermore, the audio processing system according to the present disclosure may include a function that executes voice commands, and a call function (telephone function, videophone function, or the like) that enables users to communicate via a network. In addition, the audio processing system according to the present disclosure includes one or more audio processing devices that transmit and receive audio of the conference participants.

In the following embodiment, a case where the audio processing system is applied to a remote conference (conferencing system) will be described as an example. That is to say, a conferencing system according to the present embodiment is an example of the audio processing system according to the present disclosure. For example, in the conferencing system according to the present embodiment, a conversation between users in various conference rooms is enabled by placing an audio processing device in each location (conference room), and causing the audio processing device in one conference room to receive audio spoken by a user and then transmit the audio to the audio processing devices in the other conference rooms. Moreover, the conferencing system includes a cloud server that analyzes the audio of the user received from the audio processing device to specify a command. Also, the conferencing system includes a display device, which is an example of a terminal device that executes the command. The terminal device that executes the command is not limited to the display device, and may also be the audio processing device or a user terminal held by a user.

Conferencing System 100

Figure 1:
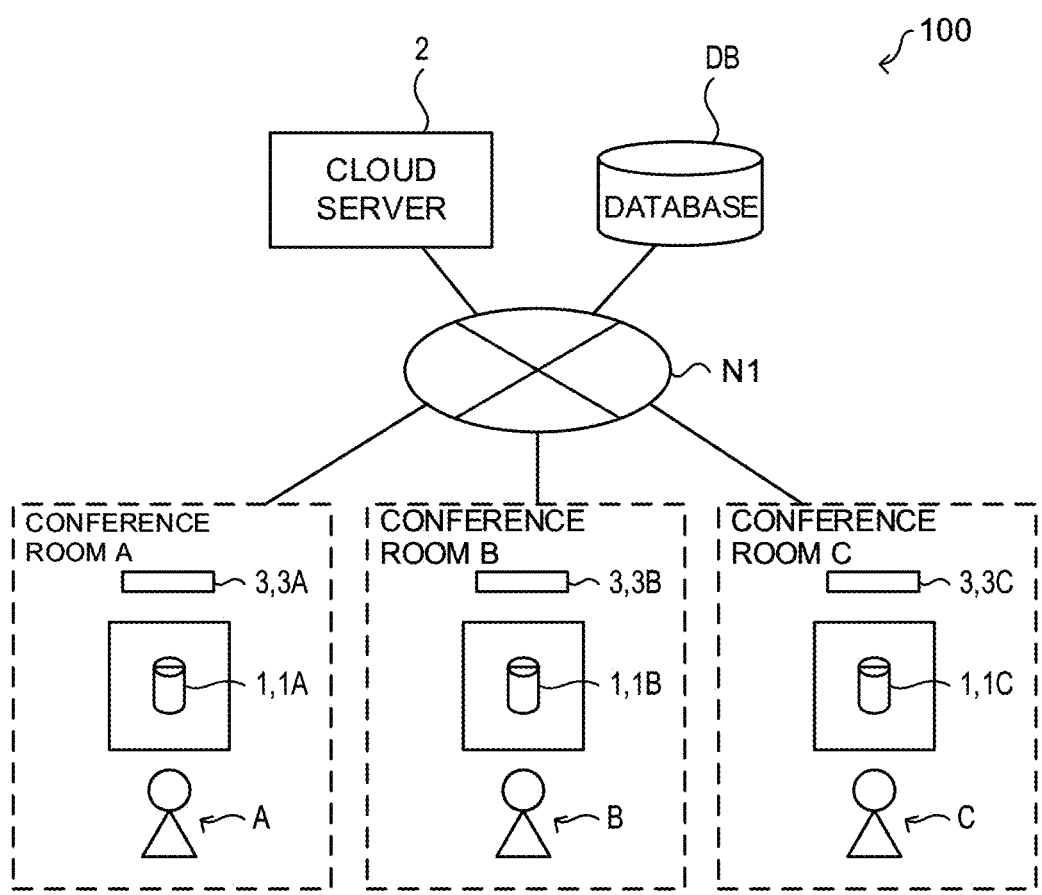
FIG. 1 is a diagram showing a schematic configuration of a conferencing system according to an embodiment of the present disclosure.

FIG. 1 is a diagram showing a schematic configuration of a conferencing system according to an embodiment of the present disclosure. The conferencing system 100 includes audio processing devices 1, a cloud server 2, display devices 3, and a database DB. Each of the audio processing devices 1A, 1B and 1C is a microphone speaker device including a microphone and a speaker, such as an AI speaker or a smart speaker. The drawing illustrates an audio processing device 1A placed in conference room A, an audio processing device 1B placed in conference room B, and an audio processing device 1C placed in conference room C. The display devices 3A, 3B and 3C include a display unit that displays various information. The drawing illustrates a display device 3A placed in conference room A, a display device 3B placed in conference room B, and a display device 3C placed in conference room C. The audio processing device 1A and the display device 3A, the audio processing device 1B and the display device 3B, the audio processing device 1C and the display device 3C, the cloud server 2, and the database DB are connected to each other via a network N1. The network N1 is a communication network such as the Internet, a LAN, a WAN, or a public telephone line. The cloud server 2 is constructed by, for example, one or more data servers (virtual servers). The database DB stores various data. The database DB may be included in the cloud server 2, included in one of the display devices 3A, 3B, and 3C, or provided in a distributed fashion in the plurality of display devices 3. Furthermore, the database DB may be included in one of the audio processing devices 1A, 1B, and 1C, or provided in a distributed fashion in the plurality of audio processing devices 1. Each of the audio processing devices 1A, 1B, and 1C is an example of the audio processing device of the present disclosure. Each of the display devices 3A, 3B, and 3C is an example of the display device and the terminal device of the present disclosure.

Here, an example of an application scenario of the conferencing system 100 will be described using the configuration shown in FIG. 1 as an example. Note that, for example, the subject (agenda) of the conference, the start date and time and the end date and time of the conference, the files used in the conference (attachment files), and information about the participants and the like (conference information D1 shown in FIG. 8) are stored in advance in the database DB (see FIG. 2). The conference information D1 is registered, for example, by the person in charge of the conference. Here, it is assumed that users A, B, and C are registered in advance as conference participants in the conference information D1.

First, user A logs in by inputting a user ID on the login screen displayed on the display device 3A in conference room A. As a result, identifying information for user A (user ID) "U001" and identifying information for the display device 3A (display device ID) "D001" are associated and registered in the participant information D3 (see FIG. 10). Similarly, user B logs in by inputting a user ID on the login screen displayed on the display device 3B in conference room B. As a result, identifying information for user B (user ID) "U002" and identifying information for the display device 3B (display device ID) "D002" are associated and registered in the participant information D3. Furthermore, user C logs in by inputting a user ID on the login screen displayed on the display device 3C in conference room C. As a result, identifying information for user C (user ID) "U003" and identifying information for the display device 3C (display device ID) "D003" are associated and registered in the participant information D3.

Figure 3:
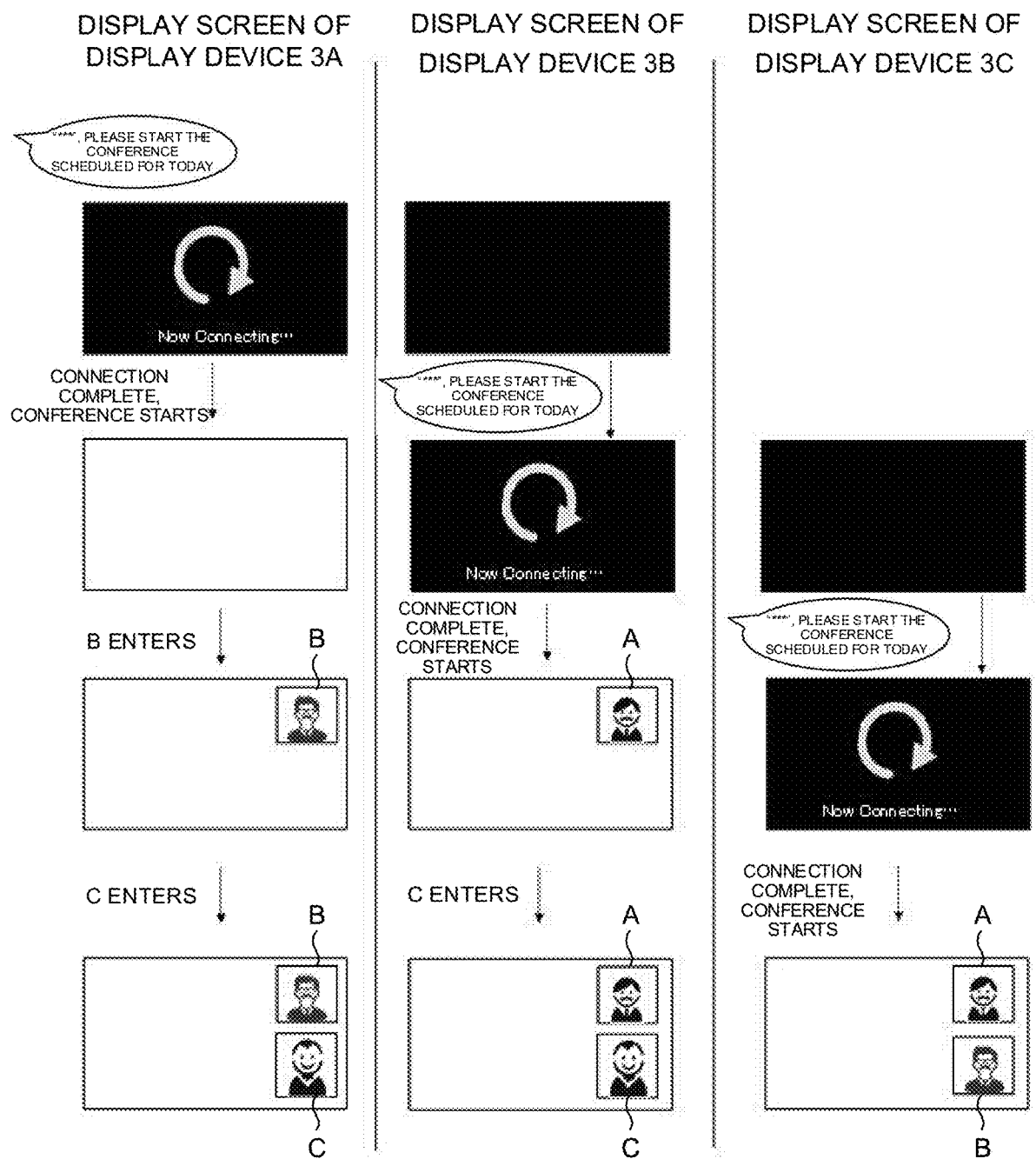
FIG. 3 is a diagram showing an example of a display screen displayed on a display device of a conferencing system according to an embodiment of the present disclosure.

Next, for example, user A speaks audio that includes a specified word (also referred to as an activation word or a wake-up word) for starting the reception of a specified command (represented by "***" in FIG. 3), and a command keyword that follows the specified word ("please start the conference scheduled for today" in FIG. 3). When the audio processing device 1A recognizes the specified word, it transmits the command keyword to the cloud server 2. The cloud server 2 specifies the command on the basis of the command keyword. Here, the cloud server 2 specifies a "start conference" command. The display device 3A executes the specified command. Consequently, the connection of the display device 3A is completed, and the conference is started.

Similarly, for example, user B speaks audio that includes the specified word and the command keyword ("please start the conference scheduled for today"). When the audio processing device 1B recognizes the specified word, it transmits the command keyword to the cloud server 2. The cloud server 2 specifies the command on the basis of the command keyword. Here, the cloud server 2 specifies a "start conference" command. The display device 3B executes the specified command. Consequently, connection of the display device 3B is completed, and the display devices 3A and 3B are connected to the same network. As a result, identifying information for user B (face image) is displayed on the display screen of the display device 3A. Further, identifying information for user A (face image) is displayed on the display screen of the display device 3B (see FIG. 3).

Similarly, for example, user C speaks audio that includes the specified word and the command keyword ("please start the conference scheduled for today"). When the audio processing device 1C recognizes the specified word, it transmits the command keyword to the cloud server 2. The cloud server 2 specifies the command on the basis of the command keyword. Here, the cloud server 2 specifies a "start conference" command. The display device 3C executes the specified command. Consequently, connection of the display device 3C is completed, and the display devices 3A, 3B and 3C are connected to the same network. As a result, identifying information for user B and user C (face images) is displayed on the display screen of the display device 3A. Further, identifying information for user A and user C (face images) is displayed on the display screen of the display device 3B. Similarly, identifying information for user A and user B (face images) is displayed on the display screen of the display device 3C (see FIG. 3).

When the conference starts, for example, the audio spoken by user A is received by the audio processing device 1A. Then, the audio processing device 1A transmits the received audio to the audio processing devices 1B and 1C via the network, and each of the audio processing devices 1B and 1C output the received audio from a speaker. A conversation is carried out between users A, B and C in this manner.

Here, for example, if user A speaks audio that includes the specified word and a command keyword of "please display help", the audio processing device 1A recognizes the specified word and transmits the command keyword to the cloud server 2. When the cloud server 2 recognizes the command keyword, it specifies a "display help" command (see FIG. 11). Furthermore, the cloud server 2 specifies target users with respect to which the command is to be executed. Here, the cloud server 2 specifies "user A", who is the speaker of the command keyword, as the target user to display and browse the help screen. The display device 3A executes the specified command. As a result, a help screen P1 is displayed on the display screen of the display device 3A (see FIG. 4). In this case, the help screen P1 is not displayed on the display screen of the display devices 3B and 3C.

Figure 5:
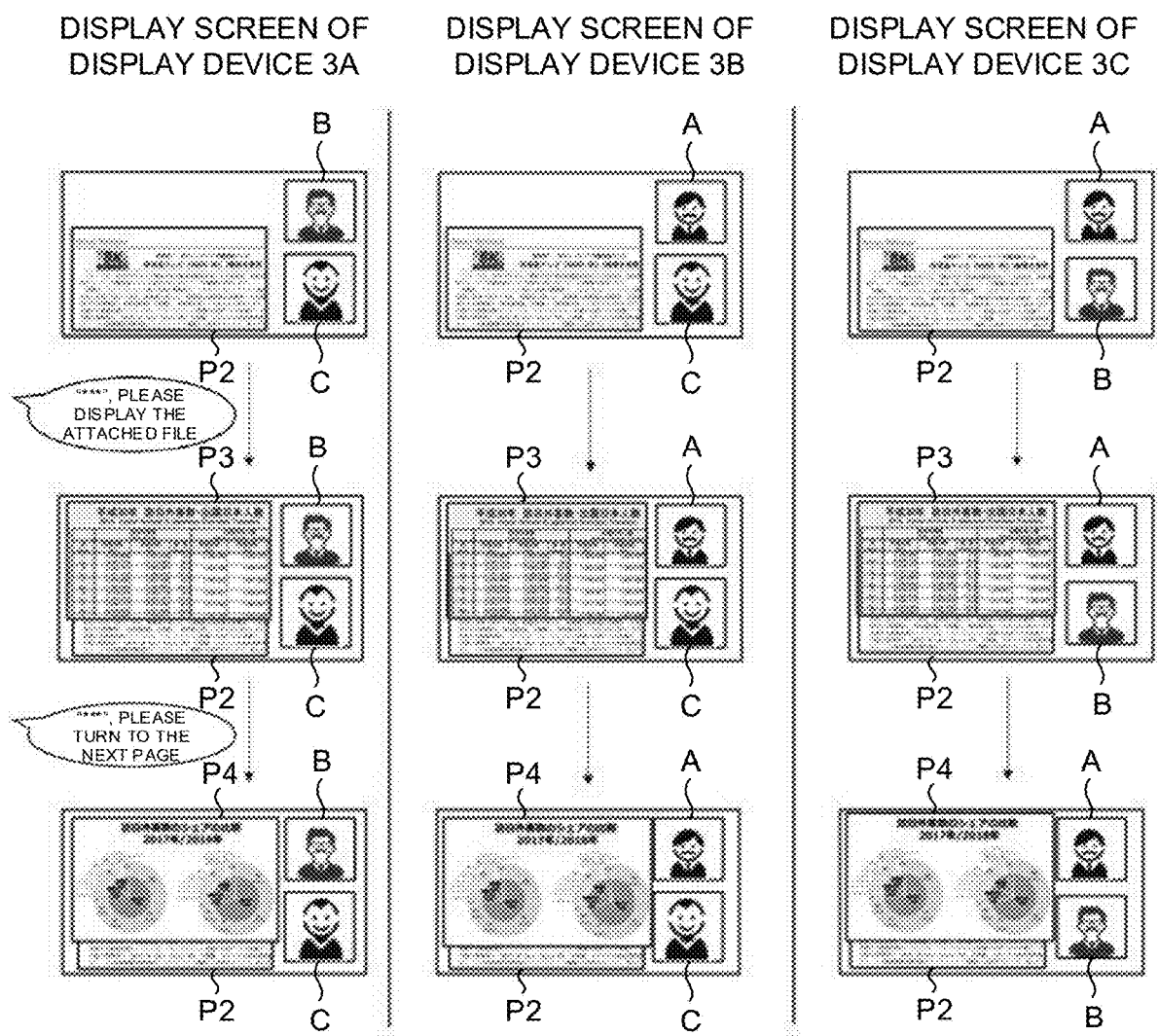
FIG. 5 is a diagram showing an example of a display screen displayed on a display device of a conferencing system according to an embodiment of the present disclosure.

In addition, for example, if user A speaks audio that includes the specified word and a command keyword of "please display attachment file", the audio processing device 1A recognizes the specified word and transmits the command keyword to the cloud server 2. When the cloud server 2 recognizes the command keyword, it specifies a "display attachment file" command (see FIG. 11). Furthermore, the cloud server 2 specifies target users with respect to which the command is to be executed. Here, the cloud server 2 specifies all of the participants that are participating in the conference, which in this case are "user A", "user B" and "user C", as the target users to display and browse the attachment file. Each of the display devices 3A, 3B and 3C execute the specified command. As a result, the same attachment file image P3 is displayed on the display screen of the respective display devices 3A, 3B and 3C, which are displaying an image P2 (see FIG. 5). The attachment file, for example, is stored in advance in the database DB, and the identifying information of the attachment file (attachment file ID "f001") is registered in the conference information D1 (see FIG. 8).

In addition, for example, if user A speaks audio that includes the specified word and a command keyword of "please turn to the next page" while the attachment file image P3 is being displayed on the display screen of the display devices 3A, 3B and 3C, the audio processing device 1A recognizes the specified word and transmits the command keyword to the cloud server 2. When the cloud server 2 recognizes the command keyword, it specifies a "page feed" command (see FIG. 11). The cloud server 2 specifies "user A", "user B" and "user C" as the target users with respect to which the command is to be executed. Each of the display devices 3A, 3B and 3C execute the specified command. As a result, the attachment file image P3 on the display screen of the respective display devices 3A, 3B and 3C switches to an image P4 of the next page (see FIG. 5).

Furthermore, for example, if user A speaks audio that includes the specified word and a command keyword of "please display " . . . "", the audio processing device 1A recognizes the specified word and transmits the command keyword to the cloud server 2. When the cloud server 2 recognizes the command keyword, it specifies a "display specified file" command (see FIG. 11). Here, it is assumed that user A has specified the "budget management table" as the specified file. The cloud server 2 specifies target users with respect to which the command is to be executed. Here, the cloud server 2 refers to the content information D5 (see FIG. 12), and specifies "user A" and "user B", who are permitted to browse the "budget management table", as the target users to display and browse the "budget management table". Each of the display devices 3A and 3B execute the specified command. As a result, the same image P5 is displayed on the display screen of the respective display devices 3A and 3B (see FIG. 6). The specified file, for example, is stored in advance in the database DB, and the identifying information of the specified file (content ID "C001") is registered in the content information D5 (see FIG. 12).

Figure 7:
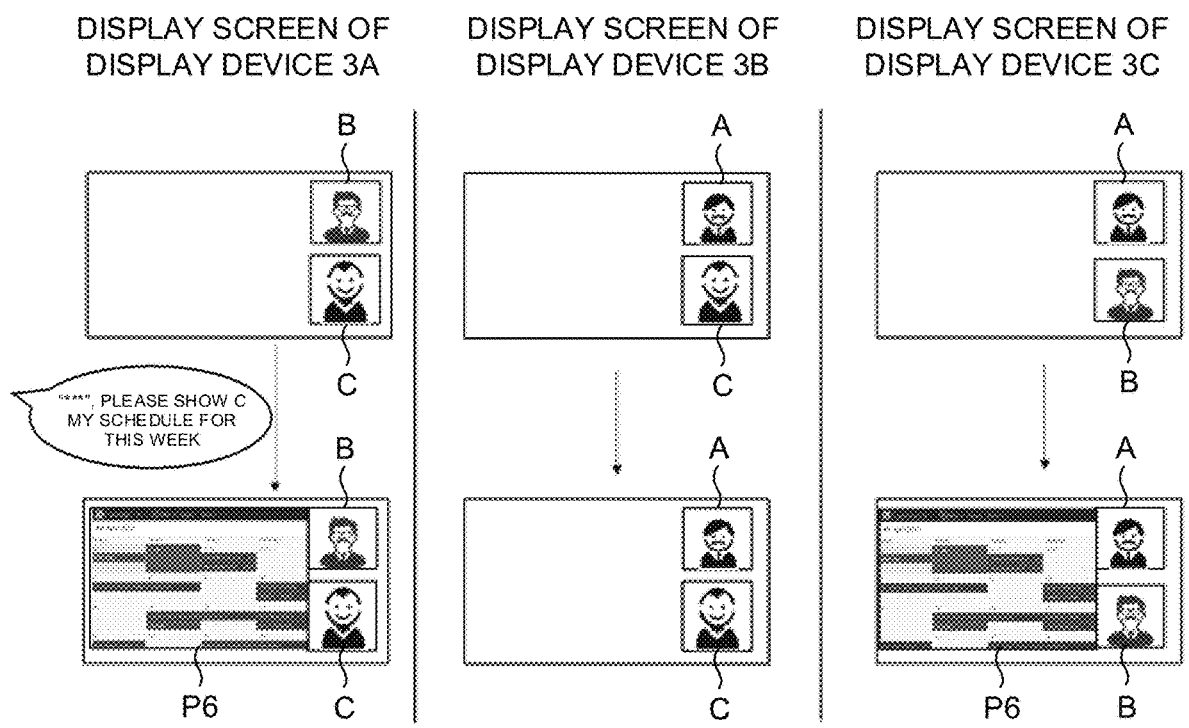
FIG. 7 is a diagram showing an example of a display screen displayed on a display device of a conferencing system according to an embodiment of the present disclosure.

Furthermore, for example, if user A speaks audio that includes the specified word and a command keyword of "please show " . . . " my schedule for this week", the audio processing device 1A recognizes the specified word and transmits the command keyword to the cloud server 2. When the cloud server 2 recognizes the command keyword, it specifies a "display schedule" command (see FIG. 11). Here, it is assumed that user A has specified "user C" as the user to be shown the schedule. The cloud server 2 specifies target users with respect to which the command is to be executed. Here, the cloud server 2 specifies the original speaker "user A", and "user C", who was specified by user A, as the target users to display and browse the schedule of user A. Each of the display devices 3A and 3C execute the specified command. As a result, an image P6 showing the schedule of user A for this week is displayed on the display screen of the respective display devices 3A and 3C (see FIG. 7). The schedule, for example, is stored in advance in the database DB, and the identifying information of the schedule (schedule ID "S001") is registered in the user information D2 (see FIG. 9).

As described above, the conferencing system 100 executes a command with respect to specified users according to the content of the command. As a result, it is possible for information corresponding to the command to be transmitted to the users in an appropriate manner. Hereinafter, a specific configuration of the conferencing system 100 will be described. In the following description, when the audio processing devices 1A, 1B and 1C are not distinguished, they are referred to as "audio processing devices 1". The cloud server 2 will be described as a single virtual server. The cloud server 2 may be replaced by a single physical server.

Audio Processing Device 1

Figure 2:
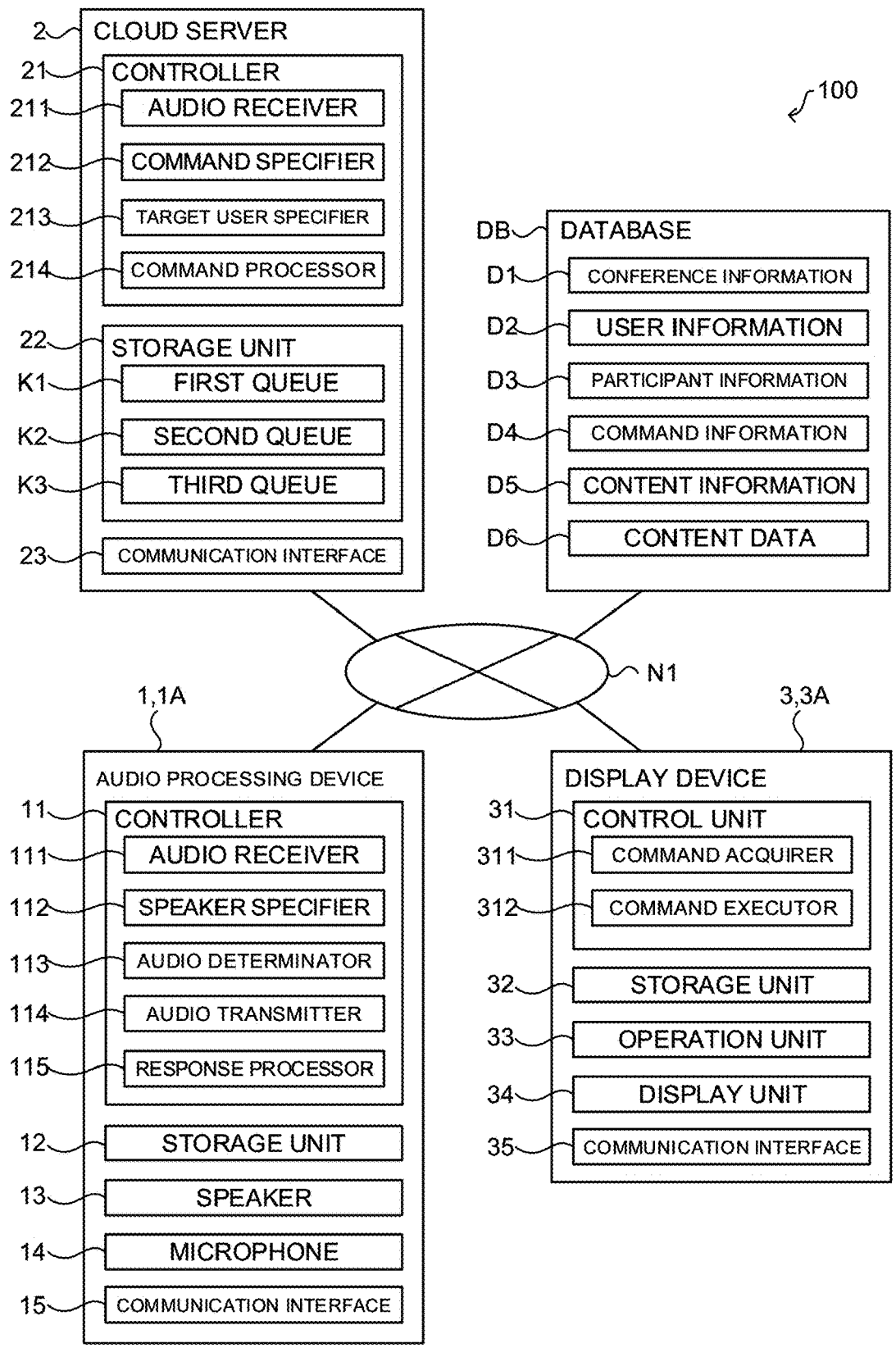
FIG. 2 is a functional block diagram showing a configuration of a conferencing system according to an embodiment of the present disclosure.

As shown in FIG. 2, the audio processing device 1 includes a controller 11, a storage unit 12, a speaker 13, a microphone 14, a communication interface 15, and the like. The audio processing device 1 may be a device such as an AI speaker or a smart speaker. The audio processing device 1 is, for example, placed on a desk in a conference room, and acquires audio of a user participating in a conference via the microphone 14, and outputs (relays) audio to the user from the speaker 13.

The communication interface 15 connects the audio processing device 1 to a wired or wireless network N1, and is a communication interface for executing data communication with other devices (such as the other audio processing devices 1, the cloud server 2, the display device 3, and the database DB) via the network N1 according to a predetermined communication protocol.

The storage unit 12 is a non-volatile storage unit such as a flash memory for storing various information. The storage unit 12 stores a control program such as an audio processing program for causing the controller 11 to execute the audio processing described below (see FIG. 13). The audio processing program is delivered, for example, from the cloud server 2 and then stored. Furthermore, the audio processing program is non-temporarily recorded on a computer-readable recording medium such as a CD or a DVD, and is stored in the storage unit 12 after being read by a reading device (not shown) such as a CD drive or a DVD drive included in the audio processing device 1.

The controller 11 includes control devices such as a CPU, a ROM, and a RAM. The CPU is a processor that executes various arithmetic processing. The ROM stores in advance a BIOS and a control program such as an OS for causing the CPU to execute various processing. The RAM stores various information and is used as a temporary storage memory (work area) for the various processing executed by the CPU. Further, the controller 11 controls the audio processing device 1 by causing the CPU to execute the various control programs stored in advance in the ROM or the storage unit 12.

Specifically, the controller 11 includes various processing units such as an audio receiver 111, a speaker specifier 112, an audio determinator 113, an audio transmitter 114, and a response processor 115. The controller 11 functions as the various processing units as a result of the CPU executing the various processing according to the control programs. Furthermore, some or all of the processing units included in the controller 11 may be configured by an electronic circuit. The audio processing program may also be a program for causing a plurality of processors to function as the variety of processing units.

The audio receiver 111 receives audio spoken by a user who is using the audio processing device 1. The audio receiver 111 is an example of an audio receiver of the present disclosure. For example, the user speaks audio that corresponds to a specified word (also referred to as an activation word or a wake-up word) for causing the audio processing device 1 to start the reception of a command, and audio that corresponds to various commands that instruct the audio processing device 1 (command audio). The audio receiver 111 receives the various audio spoken by the user.

The speaker specifier 112 specifies the user that has spoken (speaker) on the basis of the audio received by the audio receiver 111. The speaker specifier 112 is an example of a speaker specifier of the present disclosure. For example, the speaker specifier 112 specifies the speaker by comparing the audio received by the audio receiver 111 with user audio registered in advance in the storage unit 12. Furthermore, the speaker specifier 112 may specify the speaker on the basis of the audio received by the audio receiver 111 and a captured image which has been captured by a camera (not shown). For example, the speaker specifier 112 specifies the direction from which the audio was received on the basis of the direction that the microphone 14 collects the audio (speaker direction). Then, the speaker is specified on the basis of the captured image, which includes the speaker direction. For example, if a user is included in the captured image, which includes the speaker direction, the speaker specifier 112 specifies the user in the image as the speaker.

The audio determinator 113 determines, on the basis of the audio received by the audio receiver 111, whether or not the specified word is included in the audio. The audio determinator 113 is an example of an audio determinator of the present disclosure. For example, the audio determinator 113 performs audio recognition with respect to the audio received by the audio receiver 111, and converts the audio into text data. Then, the audio determinator 113 determines whether or not the specified word is included at the beginning of the text data.

The audio transmitter 114 switches the transmission destination of the audio received by the audio receiver 111 on the basis of the determination result from the audio determinator 113. Specifically, when the audio determinator 113 determines that the specified word is included in the audio received by the audio receiver 111, the audio transmitter 114 transmits text data of the keyword (command keyword), which is included in the audio and follows the specified word, to the cloud server 2. Furthermore, when the audio determinator 113 determines that the specified word is not included in the audio received by the audio receiver 111, the audio transmitter 114 transmits the audio to the other audio processing devices 1. For example, the audio transmitter 114 of the audio processing device 1A transmits audio that does not include the specified word to the audio processing devices 1B and 1C.

Here, the audio transmitter 114 may have a configuration that, on the basis of the determination result from the audio determinator 113, switches between a command transmission mode in which the audio received by the audio receiver 111 is transmitted to the cloud server 2, and an audio transmission mode that transmits the audio received by the audio receiver 111 to the other audio processing devices 1. For example, if the audio determinator 113 determines that the audio received by the audio receiver 111 includes the specified word, the audio transmitter 114 sets (switches) the transmission mode to the command transmission mode. When the transmission mode is set to the command transmission mode, the audio transmitter 114 transmits the command keyword (text data) that follows the specified word to the cloud server 2. Furthermore, the audio transmitter 114 sets (switches) the transmission mode to the audio transmission mode after transmitting the command keyword to the cloud server 2. When the transmission mode is set to the audio transmission mode, the audio transmitter 114 transmits the audio received by the audio receiver 111 to the other audio processing devices 1. As described above, when the audio transmitter 114 receives the specified word, it switches to the command transmission mode and transmits the command keyword to the cloud server 2, and switches to the audio transmission mode when the transmission processing of the command keyword is completed. As a result, the command keyword is transmitted to the cloud server 2 each time the specified word is spoken. Therefore, it is possible to prevent the audio of a normal conversation from being erroneously transmitted to the cloud server 2.

The response processor 115 acquires from the cloud server 2 a response corresponding to the command specified by the cloud server 2 (command response), and outputs the command response from the speaker 13. For example, if the command has content which relates to outputting an information search, the response processor 115 acquires the search result from the cloud server 2, and outputs the search result from the speaker 13.

Cloud Server 2

As shown in FIG. 2, the cloud server 2 includes a controller 21, a storage unit 22, a communication interface 23, and the like.

The communication interface 23 connects the cloud server 2 to a wired or wireless network N1, and is a communication interface for executing data communication with other devices (such as the audio processing devices 1A, 1B and 1C, the display devices 3A, 3B and 3C, and the database DB) via the network N1 according to a predetermined communication protocol.

The storage unit 22 is a non-volatile storage unit such as a flash memory for storing various information. The storage unit 22 stores a control program such as an audio processing program for causing the controller 21 to execute the audio processing described below (see FIG. 13). For example, the audio processing program is non-temporarily recorded on a computer-readable recording medium such as a CD or a DVD, and is stored in the storage unit 22 after being read by a reading device (not shown) such as a CD drive or a DVD drive included in the cloud server 2. Furthermore, the storage unit 22 stores text data of the command keyword received from the audio processing device 1 and the like.

The controller 21 includes control devices such as a CPU, a ROM, and a RAM. The CPU is a processor that executes various arithmetic processing. The ROM stores in advance a BIOS and a control program such as an OS for causing the CPU to execute various processing. The RAM stores various information and is used as a temporary storage memory (work area) for the various processing executed by the CPU. Further, the controller 21 controls the cloud server 2 by causing the CPU to execute various control programs stored in advance in the ROM or the storage unit 22.

Moreover, the controller 21 executes the various processing by referring to the database DB. As shown in FIG. 2, the database DB stores data such as conference information D1, user information D2, participant information D3, command information D4, content information D5, content data D6, and the like.

FIG. 8 illustrates an example of conference information D1. In the conference information D1, information for each conference such as the "conference ID", "subject", "start date and time", "end date and time", "attachment file ID", and "participant IDs" are registered such that they are associated with each other. The "conference ID" represents identifying information of the conference. The "subject" is the subject (agenda) of the conference. The "start date and time" is the start date and time of the conference. The "end date and time" is the end date and time of the conference. The "attachment file ID" represents identifying information of a file (material) used in the conference. The "participant IDs" represents identifying information (user IDs) of the users participating in the conference. The file data corresponding to the attachment file ID is stored in the database DB. The file data is included in the content data D6. The conference information D1 is registered in advance by the person in charge when it is determined that the conference will be held. FIG. 8 illustrates that user A ("U001"), user B ("U002"), user C ("U003") are registered as the participants of the conference.

FIG. 9 illustrates an example of user information D2. In the user information D2, information for each user such as the corresponding "user ID", "user name", and "schedule ID" are registered such that they are associated with each other. In the user information D2, in addition to information relating to the users that are participating in the conference, information relating to all users that are permitted to use the conferencing system 100 is registered in advance. For example, information relating to all of the employees within a company is registered in the user information D2. The "user ID" represents identifying information of a user. The "user name" is the name of the user. The "schedule ID" represents identifying information of the schedule of the user. The "schedule ID" is registered as needed. The schedule data corresponding to the schedule ID is stored in the database DB. The schedule data is included in the content data D6.

FIG. 10 illustrates an example of participant information D3. In the participant information D3, information for each conference such as the corresponding "participant IDs", "participant names" and "display device IDs" are registered such that they are associated with each other. The "participant IDs" represent identifying information of the users participating in the conference. The "participant names" represent the names of the users. The "display device IDs" represent identifying information of the display devices used by the participants, such as the display devices 3 placed in the locations (conference rooms) from which the participants are participating in the conference. For example, when the participant performs a login operation with respect to the display device 3 placed in the conference room, a participant ID, a participant name and a display device ID are registered in the participant information D3 such that they are associated each other. For example, when user A logs in by inputting the user ID "U001" into the login screen displayed on the display device 3A in conference room A, the user ID "U001" and the identifying information of the display device 3A (display device ID) "D001" are registered in the participant information D3 such that they are associated with each other. Similarly, when user B logs in by inputting the user ID "U002" into the login screen displayed on the display device 3B in conference room B, the user ID "U002" and the display device ID "D002" of the display device 3B are registered in the participant information D3 such that they are associated with each other. Further, when user C logs in by inputting the user ID "U003" into the login screen displayed on the display device 3C in conference room C, the user ID "U003" and the display device ID "D003" of the display device 3C are registered in the participant information D3 such that they are associated with each other. The login processing is not limited to the method described above. For example, the information may be registered in the participant information D3 as a result of a portable terminal (such as a smartphone) or an ID card held by the user performing wireless communication with the display device 3 or the audio processing device 1.

FIG. 11 illustrates an example of command information D4. In the command information D4, information for each keyword (command keyword) such as the corresponding "keyword", "command", and "target user" are registered such that they are associated with each other. They keyword is information that represents the command keyword. The "command" is information that represents the content of the command. The "target user" is information that represents the target user with respect to which the command is to be executed. As shown in FIG. 11, predetermined commands are registered with respect to each keyword. Further, a target user is registered with respect to each keyword.

For example, if the "command" is "start conference", a "target user" is not registered. Furthermore, if the "command" is "display help", the "speaker" who is requesting the help-related information is registered as the "target user". Moreover, if the "command" is "display attachment file", the attachment file is registered in the conference information D1 (see FIG. 8), and "all participants" of the conference are registered as the "target user" because the material is necessary for the conference. In addition, if the "command" is "page feed", the "participants currently displaying the file" who are displaying the corresponding file are registered as the "target user".

Furthermore, if the "command" is "display specified file", the "approved participants", which represent those participants that are permitted to browse the specified file, are registered as the "target user". Here, as shown in FIG. 12, in the content information D5, information for each piece of content such as the corresponding "content ID", "content name", and "approved users" are registered such that they are associated with each other. The "content ID" represents identifying information of content such as files (document files, material files, and schedules and the like) and images (still images and video and the like). The "approved users" represents information which indicates the users that have an access permission to browse, display, or acquire the content. For example, user A and user B have a browsing permission with respect to the "budget management table" having content ID "C001", but user C does not have a browsing permission. Therefore, for example, if the "keyword" is "please display the budget management table", the "target user" becomes "user A" and "user B". If the "keyword" is "please display the patent drawings", the "target user" becomes "user A" and "user C".

Furthermore, if the "command" is "display schedule", the "target user" is the user specified by the speaker. That is to say, the "specified participant", who is the user corresponding to the user name included in the keyword (an example of a user specifying word of the present disclosure) is registered as the "target user". For example, if the keyword is "please show C my schedule for this week", "user A" and "user C" are registered as the "target user".

In another embodiment, some or all of the information such as the conference information D1, the user information D2, the participant information D3, the command information D4, the content information D5, and the content data D6 may be stored in any one of the audio processing device 1, the cloud server 2, or the display device 3. The information may also be stored in a distributed fashion in a plurality of these devices. Furthermore, in another embodiment, the information may be stored in a server which is accessible from the conferencing system 100. In this case, the conferencing system 100 may acquire the information from the server and then execute processing such as the audio processing (see FIG. 13) described below.

As shown in FIG. 2, the controller 21 includes various processing units such as an audio receiver 211, a command specifier 212, a target user specifier 213, and a command processor 214. The controller 21 functions as the various processing units as a result of the CPU executing the various processing according to the control programs. Furthermore, some or all of the processing units included in the controller 21 may be configured by an electronic circuit. The control programs may be programs for causing a plurality of processors to function as the variety of processing units.

The audio receiver 211 receives the command keyword transmitted from the audio processing device 1. The command keyword is a word (text data) that follows the specified word, which is included at the beginning of the text data of the audio received by the audio processing device 1. Specifically, when the audio processing device 1 detects the specified word and transmits the command keyword to the cloud server 2, the cloud server 2 receives the command keyword.

The command specifier 212 specifies the command on the basis of the command keyword received by the audio receiver 211. The command specifier 212 is an example of a command specifier 212 of the present disclosure. For example, the command specifier 212 refers to the command information D4 (see FIG. 11) stored in the database DB, and specifies the command corresponding to the command keyword. In the present embodiment, a configuration is used in which a plurality of combinations of command keywords and commands are registered in advance in the command information D4. Then, the command which matches the command keyword is specified from within the command information D4. However, the command specifying method is not limited to this. For example, the command specifier 212 may specify the command by interpreting the meaning of the content of a user instruction on the basis of predetermined terms included in the command keyword such as "help", "file", and "feed", and the clauses and syntax of the command keyword as a whole. For example, the command specifier 212 may specify the command from the command keyword using a known method such as morphological analysis, syntax analysis, semantic analysis, or machine learning.

The target user specifier 213 specifies (determines), on the basis of the content (type) of the command specified by the command specifier 212, the target user with respect to which the command is to be executed. The target user specifier 213 is an example of a target user specifier of the present disclosure. For example, the target user specifier 213 refers to the command information D4 (see FIG. 11), and specifies the target user associated with the command specified by the command specifier 212. For example, if a word that specifies the target user (user specifying word) is included in the command keyword, the target user specifier 213 specifies the target user on the basis of that word. Furthermore, if the command causes predetermined content to be displayed, and the content is set with user browsing permissions, the target user specifier 213 specifies the target user as a user having permission to browse the content.

The command processor 214 stores information relating to the command specified by the command specifier 212 in a command storage area (queue) corresponding to the display device 3 associated with the target user specified by the target user specifier 213. For example, the storage unit 22 includes one or more command storage areas corresponding to the display device IDs registered in the participant information D3. Here, the storage unit 22 includes a first queue K1 corresponding to the display device 3A having the display device ID "D001", a second queue K2 corresponding to the display device 3B having the display device ID "D002", and a third queue K3 corresponding to the display device 3C having the display device ID "D003".

For example, the command processor 214 stores information relating to the command "display help" specified by the command specifier 212 in the first queue K1, which corresponds to the display device 3A having the display device ID "D001" associated with the user ID "U001" of the target user "user A" specified by the target user specifier 213. Furthermore, for example, the command processor 214 stores information relating to the command "display attachment file" specified by the command specifier 212 in the first queue K1, which corresponds to the display device 3A having the display device ID "D001" associated with the user ID "U001" of the target user "user A" specified by the target user specifier 213. Further, the information is also stored in the second queue K2, which corresponds to the display device 3B having the display device ID "D002" associated with the user ID "U002" of the target user "user B". Similarly, the information is also stored in the third queue K3, which corresponds to the display device 3C having the display device ID "D003" associated with the user ID "U003" of the target user "user C". Similarly, for example, the command processor 214 stores information relating to the command "display schedule" specified by the command specifier 212 in the first queue K1, which corresponds to the display device 3A, and the third queue K3, which corresponds to the display device 3C.

The data (command) stored in the queues are read by the display device 3 corresponding to each queue. Then, the display device 3 executes the command.

Display Device 3

As shown in FIG. 2, the display device 3 includes a controller 31, a storage unit 32, an operation unit 33, a display unit 34, a communication interface 35, and the like.

The operation unit 33 represents a mouse, keyboard, touch panel, or the like, which receives user operations with respect to the display device 3. The display unit 34 is a display panel such as a liquid crystal display or an organic EL display that displays various information. The operation unit 33 and the display unit 34 may also be a user interface which is integrally formed.

The communication interface 35 connects the display device 3 to a wired or wireless network N1, and is a communication interface for executing data communication with other devices (such as the audio processing devices 1A, 1B and 1C, the cloud server 2, and the database DB) via the network N1 according to a predetermined communication protocol.

The storage unit 32 is a non-volatile storage unit such as a flash memory for storing various information. The storage unit 32 stores a control program such as an audio processing program for causing the controller 31 to execute the audio processing described below (see FIG. 13). For example, the audio processing program is non-temporarily recorded on a computer-readable recording medium such as a CD or a DVD, and is stored in the storage unit 32 after being read by a reading device (not shown) such as a CD drive or a DVD drive included in the display device 3.

The controller 31 includes control devices such as a CPU, a ROM, and a RAM. The CPU is a processor that executes various arithmetic processing. The ROM stores in advance a BIOS and a control program such as an OS for causing the CPU to execute various processing. The RAM stores various information and is used as a temporary storage memory (work area) for the various processing executed by the CPU. Further, the controller 31 controls the display device 3 by causing the CPU to execute the various control programs stored in advance in the ROM or the storage unit 32.

Specifically, the controller 31 includes various processing units such as a command acquirer 311 and a command executor 312. The controller 31 functions as the various processing units as a result of the CPU executing the various processing according to the control programs. Furthermore, some or all of the processing units included in the controller 31 may be configured by an electronic circuit. The control programs may be programs for causing a plurality of processors to function as the variety of processing units.

The command acquirer 311 acquires a command which is stored in the command storage area (queue) of the cloud server 2. Specifically, for example, the command acquirer 311 of the display device 3A monitors the first queue K1 corresponding to the display device 3A, and acquires a command when a command is stored in the first queue K1. Similarly, the command acquirer 311 of the display device 3B monitors the second queue K2 corresponding to the display device 3B, and acquires a command when a command is stored in the second queue K2. Furthermore, the command acquirer 311 of the display device 3C monitors the third queue K3 corresponding to the display device 3C, and acquires a command when a command is stored in the third queue K3. The command processor 214 of the cloud server 2 may also transmit data relating to the command to the corresponding display device 3, and the command acquirer 311 may acquire the command.

The command executor 312 executes the command specified by the command specifier 212 of the cloud server 2 with respect to the target user specified by the target user specifier 213 of the cloud server 2. The command executor 312 is an example of a command executor of the present disclosure. Specifically, the command executor 312 executes the command acquired by the command acquirer 311. For example, the command executor 312 of the display device 3A executes the command stored in the first queue K1 acquired by the command acquirer 311. Similarly, the command executor 312 of the display device 3B executes the command stored in the second queue K2 acquired by the command acquirer 311. Furthermore, the command executor 312 of the display device 3C executes the command stored in the third queue K3 acquired by the command acquirer 311.

Figure 4:
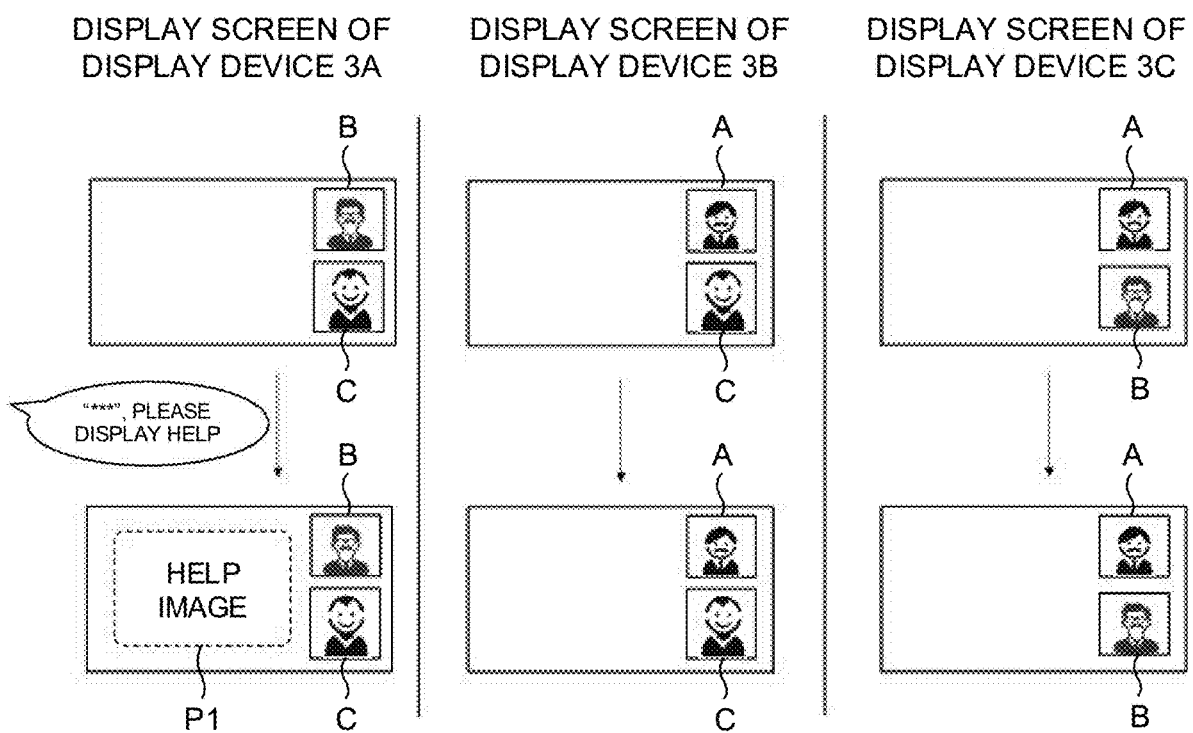
FIG. 4 is a diagram showing an example of a display screen displayed on a display device of a conferencing system according to an embodiment of the present disclosure.

For example, the command executor 312 of the display device 3A displays the help image P1 on the display screen of the display unit 34 of the display device 3A (see FIG. 4). Furthermore, the command executor 312 of each display device 3A, 3B and 3C displays the attachment file image P3 on the display screen of the display unit 34 of each display device 3A, 3B and 3C (see FIG. 5). Moreover, the command executor 312 of each display device 3A and 3B displays the image P5 of the specified file (such as the "budget management table") on the display screen of the display unit 34 of each display device 3A and 3B (see FIG. 6). In addition, the command executor 312 of each display device 3A and 3C displays the schedule image P6 (such as the "schedule of user A") on the display screen of the display unit 34 of each display device 3A and 3C (see FIG. 7).

As described above, when the target user specifier 213 specifies a first user as the target user with respect to which a first command is to be executed, the command executor 312 displays a first content corresponding to the first command on a first display device 3. On the other hand, when the target user specifier 213 specifies a first user and a second user as target users with respect to which a second command is to be executed, the command executor 312 displays a second content corresponding to the second command on a first display device 3 and a second display device 3.

Audio Processing

Figure 13:
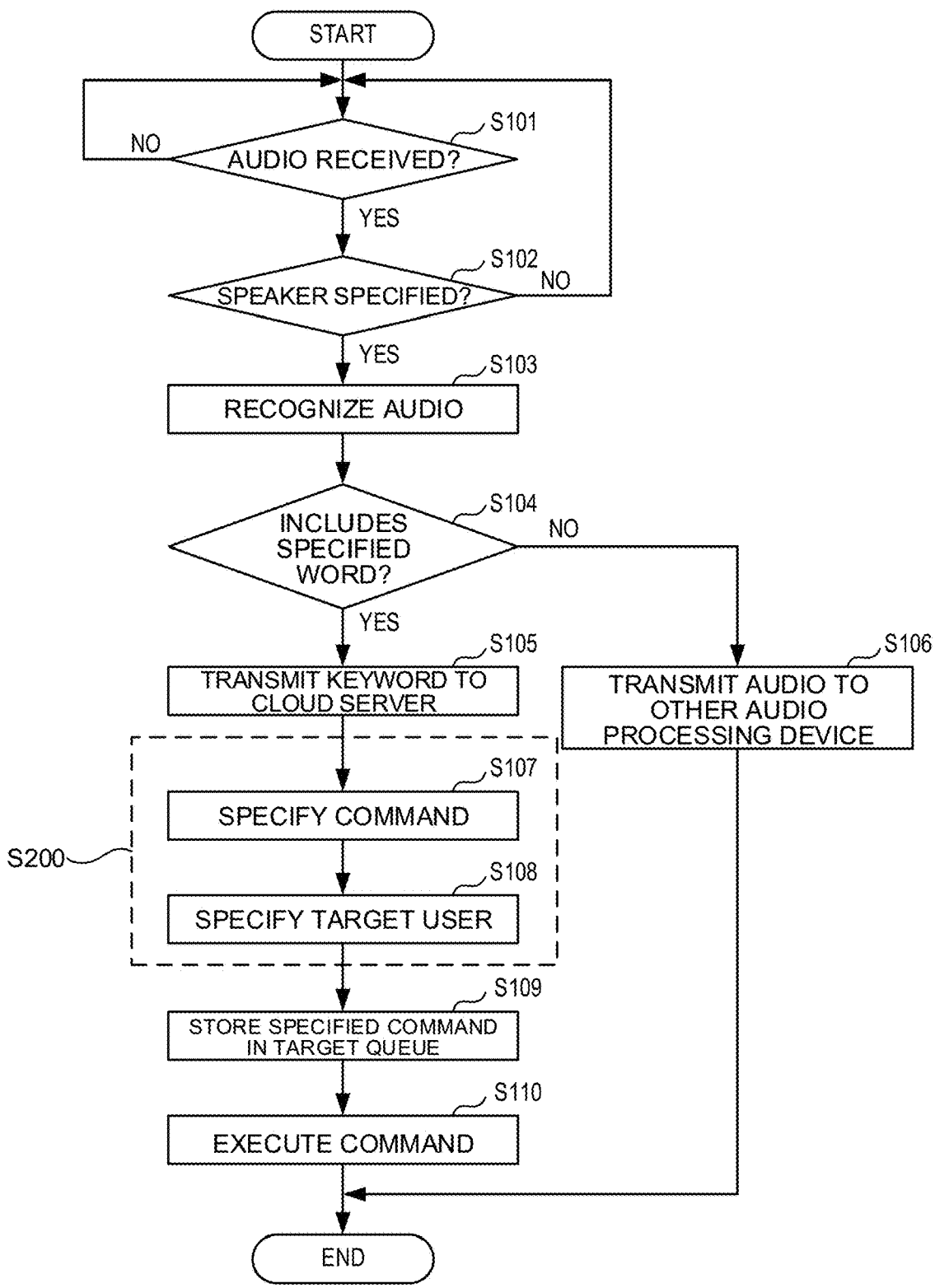
FIG. 13 is a flowchart for describing an example of an audio processing procedure in a conferencing system according to an embodiment of the present disclosure.
Figure 14:
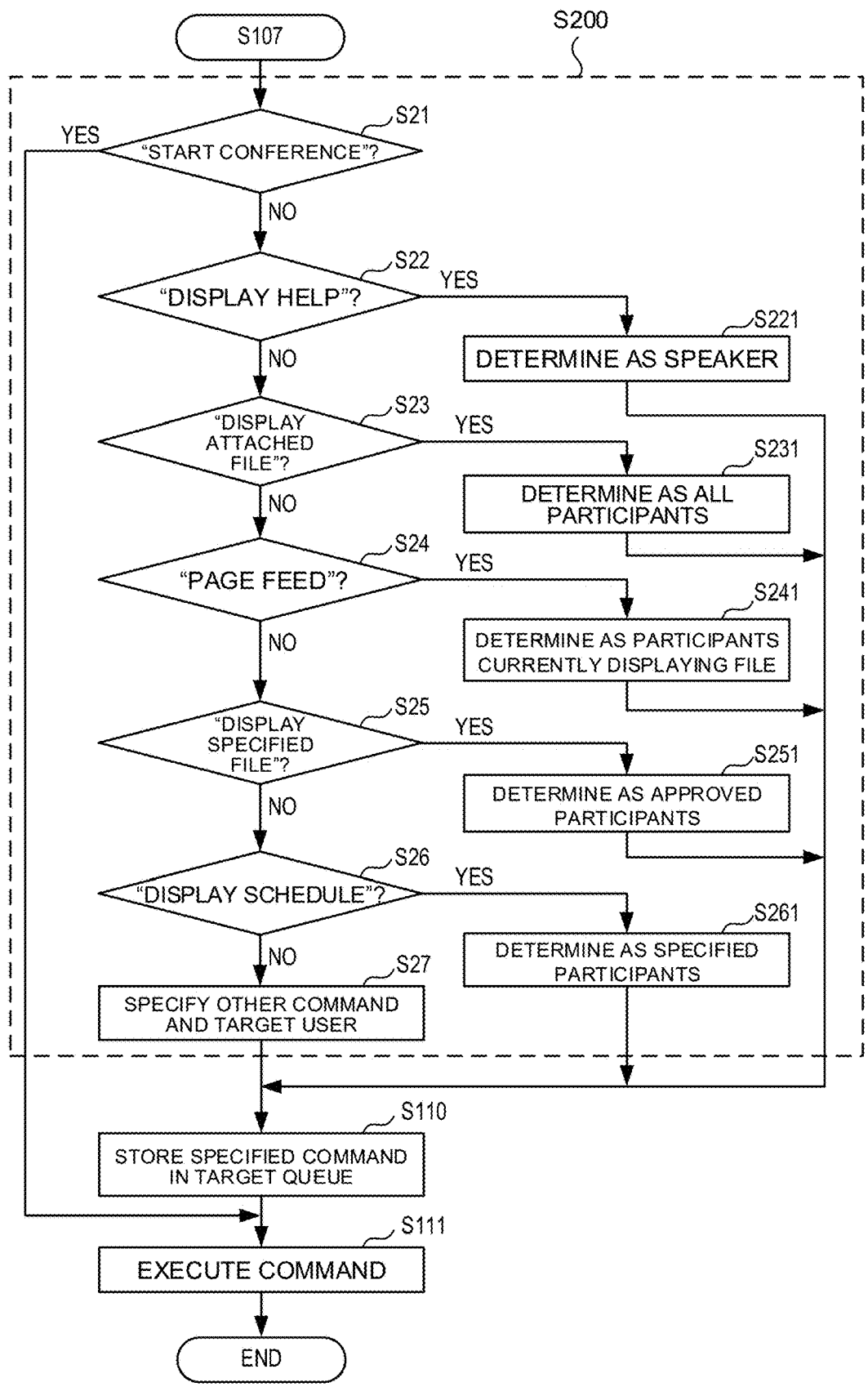
FIG. 14 is a flowchart for describing an example of an audio processing procedure in a conferencing system according to an embodiment of the present disclosure.

Hereinafter, an example of an audio processing procedure executed by the controller 11 of the audio processing device 1, the controller 21 of the cloud server 2, and the controller 31 of the display device 3 will be described with reference to FIG. 13 and FIG. 14. Here, the audio processing will be described by focusing on the audio processing device 1A and the display device 3A of the conferencing system 100 shown in FIG. 1. For example, the controller 11 of the audio processing device 1A starts executing the audio processing program by receiving audio of user A, thereby starting the execution of the audio processing. The audio processing is executed individually and in parallel in each of the audio processing devices 1A, 1B and 1C.

The present disclosure can be considered an invention of an audio processing method which executes one or more of the steps included in the audio processing. Furthermore, one or more of the steps included in the audio processing described here may be appropriately omitted. Moreover, the steps of the audio processing may be executed in a different order as long as the same effect is obtained. In addition, a case where each of the steps of the audio processing is executed by the controllers 11, 21 and 31 will be described here as an example. However, in another embodiment, each of the steps of the audio processing may be executed in a distributed fashion by one or more processors.

In step S101, the controller 11 of the audio processing device 1A determines whether or not audio has been received from user A. If the controller 11 has received the audio from user A (S101: YES), the processing proceeds to step S102. The controller 11 waits until the audio is received from user A (S101: NO). Step S101 is an example of an audio receiving step of the present disclosure.

In step S102, the controller 11 determines whether or not a speaker has been determined on the basis of the received audio. If a speaker has been specified by the controller 11 (S102: YES), the processing proceeds to step S103. If a speaker has not been specified by the controller 11 (S102: YES), the processing returns to step S101. Step S102 is an example of a speaker specifying step of the present disclosure.

In step S103, the controller 11 recognizes the audio. Specifically, the controller 11 recognizes the audio and converts the audio data into text data.

Next, in step S104, the controller 11 determines whether or not the specified word is included in the text data. If it is determined by the controller 11 that the specified word is included in the text data (S104: YES), the processing proceeds to step S105. On the other hand, if it is determined by the controller 11 that the specified word is not included in the text data (S104: NO), the processing proceeds to step S106. If the specified word is not included in the text data, the audio represents conversation audio from the conference. Therefore, in step S106, the controller 11 transmits the audio to the other audio processing devices 1B and 1C as audio data. Step S104 is an example of an audio determination step of the present disclosure.

In step S105, the controller 11 transmits the text data corresponding to a keyword (command keyword) that follows the specified word to the cloud server 2.

The controller 21 of the cloud server 2 receives the text data corresponding to the command keyword from the audio processing device 1A. In step S107, the controller 21 specifies the command corresponding to the command keyword. For example, the controller 21 refers to the command information D4 (see FIG. 11), and specifies the command corresponding to the command keyword. Step S107 is an example of a command specifying step of the present disclosure.

Next, in step S108, the controller 21 specifies the target user with respect to which the specified command is to be executed. Specifically, the controller 21 specifies the target user on the basis of the content (type) of the command. For example, the controller 21 refers to the command information D4 (see FIG. 11), and specifies the target user associated with the command. Step S108 is an example of a target user specifying step of the present disclosure.

Next, in step S109, the controller 21 stores the specified command in a command storage area (queue) corresponding to the display device 3 associated with the specified target user. For example, the controller 21 stores the command in the first queue K1 (see FIG. 2), which corresponds to the display device 3A ("D001") associated with user A (see FIG. 10), who is the target user.

Next, in step S110, the controller 31 of the display device 3 acquires the command corresponding to its own device from the command storage area, and executes the command. For example, when the command is stored in the first queue K1, the controller 31 of the display device 3A acquires and executes the command. Step S110 is an example of a command execution step of the present disclosure.

Here, a specific example of the command specifying processing of step S107 and the target user specifying processing of step S108 will be described. FIG. 14 is a flowchart showing an example of the processing S200 which includes the command specifying processing and the target user specifying processing.

When the command corresponding to the command keyword is specified in step S107, the controller 21 of the cloud server 2 determines in step S21 whether or not the command is "start conference". If it is determined by the controller 21 that the command is "start conference" (S21: YES), the processing proceeds to step S111. For example, the controller 21 transmits the command to the target display device 3. In step S111, the controller 31 of the display device 3 executes the "start conference" command, and the connection is completed (see FIG. 3). On the other hand, if it is determined by the controller 21 that the command is not "start conference" (S21: NO), the processing proceeds to step S22.

In step S22, the controller 21 determines whether or not the command is "display help". If it is determined by the controller 21 that the command is "display help" (S22: YES), the processing proceeds to step S221. In step S221, the controller 21 determines that the speaker is the target user. Then, in step S110, the controller 21 stores the command in the command storage area of the display device 3 associated with the speaker. As a result, a help screen P1 is displayed on the display screen of the display unit 34 of the display device 3 (see FIG. 4). On the other hand, if it is determined by the controller 21 that the command is not "display help" (S22: NO), the processing proceeds to step S23.

In step S23, the controller 21 determines whether or not the command is "display attachment file". If it is determined by the controller 21 that the command is "display attachment file" (S23: YES), the processing proceeds to step S231. In step S231, the controller 21 determines that all of the conference participants are target users. Then, in step S110, the controller 21 stores the command in the command storage area of the display devices 3 associated with each participant. As a result, an attachment file image P3 is displayed on the display screen of the display unit 34 of each display device 3 (see FIG. 5). On the other hand, if it is determined by the controller 21 that the command is not "display attachment file" (S23: NO), the processing proceeds to step S24.

In step S24, the controller 21 determines whether or not the command is "page feed". If it is determined by the controller 21 that the command is "page feed" (S24: YES), the processing proceeds to step S241. In step S241, the controller 21 determines that the participants who are currently displaying the file conference participants are target users. Then, in step S110, the controller 21 stores the command in the command storage area of the display devices 3 associated with each participant. As a result, the image currently being displayed on the display screen of the display unit 34 of each display device 3 (such as the attachment file image P3) switches to an image P4 of the next page (see FIG. 5). On the other hand, if it is determined by the controller 21 that the command is not "page feed" (S24: NO), the processing proceeds to step S25.

In step S25, the controller 21 determines whether or not the command is "display specified file". If it is determined by the controller 21 that the command is "display specified file" (S25: YES), the processing proceeds to step S251. In step S251, the controller 21 determines that the participants who are permitted to browse the specified file are target users. Then, in step S110, the controller 21 stores the command in the command storage area of the display devices 3 associated with the approved users. As a result, an image P5 is displayed on the display screen of the display unit 34 of each display device 3 (see FIG. 6). On the other hand, if it is determined by the controller 21 that the command is not "display specified file" (S25: NO), the processing proceeds to step S26.

In step S26, the controller 21 determines whether or not the command is "display schedule". If it is determined by the controller 21 that the command is "display schedule" (S26: YES), the processing proceeds to step S261. In step S261, the controller 21 determines that the user specified in the command keyword to be shown the schedule is the target user. Then, in step S110, the controller 21 stores the command in the command storage area of the display device 3 associated with the specified user. As a result, an image P6 is displayed on the display screen of the display unit 34 of the display device 3 (see FIG. 7). On the other hand, if it is determined by the controller 21 that the command is not "display schedule" (S26: NO), the processing proceeds to step S27. In step S27, the controller 21 specifies the command specified by the user, and the target user of the command as described in the example above.

The conferencing system 100 executes the audio processing in the manner described above. As mentioned above, the conferencing system 100 according to the present embodiment specifies, on the basis of the content of a command spoken by a user, a target user with respect to which the command is to be executed, and executes the command with respect to the specified target user. As a result, it is possible to provide information generated in response to a command only to those users who require the information. Therefore, it is possible to appropriately transmit to users the information generated in response to a command.

The audio processing system according to the present disclosure may freely combine the embodiments described above within the scope of the invention set forth in the claims, or may be configured by appropriately modifying or omitting parts of the embodiments.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. An audio processing system comprising a plurality of terminal devices respectively placed in different areas, a plurality of audio processing devices respectively placed in the different areas, and a server connected to each of the plurality of terminal devices and the plurality of audio processing devices via a network, wherein
the server includes:
a plurality of command storage areas that respectively correspond to the plurality of terminal devices;
an audio receiver that receives audio of a speaker from each of the plurality of audio processing devices;
a speaker specifier that specifies the speaker among a plurality of users who are respectively present in the different areas, on the basis of the audio received by the audio receiver;
an audio determinator that determines, on the basis of the audio received by the audio receiver, whether or not a specified word for starting a reception of a predetermined command is included in the audio;

a command specifier that specifies, when the audio determinator determines that the specified word is included in the audio, a command on the basis of a command keyword which is included in the audio and follows the specified word;

a target user specifier that specifies, among the plurality of users who are respectively present in the different areas, on the basis of the content of the command specified by the command specifier, a target user with respect to which the command is to be executed; and a command processor that stores information relating to the command specified by the command specifier in one of the plurality of command storage areas that corresponds to one of the plurality of terminal devices that is placed in an area in which the target user specified by the target user specifier is present, each of the plurality of terminal devices includes a command executor that monitors one of the plurality of command storage areas that corresponds to a terminal device that includes the command executor itself, and the command executor executes the command when the information relating to the command is stored in one of the plurality of command storage areas that corresponds to the terminal device that includes the command executor itself.

2. The audio processing system according to claim 1, wherein
the target user specifier specifies, when the command causes predetermined content to be displayed and the content is set with a user browsing permission, the target user as a user having permission to browse the content.

3. The audio processing system according to claim 1, comprising
a first terminal device corresponding to a first user and a second terminal device corresponding to a second user which are connected to each other via a network, wherein
the command executor displays, when the target user specifier specifies the first user as the target user with respect to which a first command is to be executed, a first content corresponding to the first command on the first terminal device, and
the command executor displays, when the target user specifier specifies the first user and the second user as the target users with respect to which a second command is to be executed, a second content corresponding to the second command on the first terminal device and the second terminal device.

4. The audio processing system according to claim 1, further comprising
a command storage area for each target terminal device with respect to which the command specified by the command specifier is to be executed, wherein
the command executor is provided in each of the plurality of terminal devices,
a first command executor of a first terminal device executes, when a first command is registered in a first command storage area corresponding to the first terminal device, the first command, and
a second command executor of a second terminal device executes, when a second command is registered in a second command storage area corresponding to the second terminal device, the second command.

5. The audio processing system according to claim 1, further comprising
an audio transmitter that transmits the audio received by the audio receiver to a second user when a first user is specified by the speaker specifier as the speaker of the audio received by the audio receiver, and the audio determinator determines that the audio spoken by the first user does not include the specified word.

6. The audio processing system according to claim 1, wherein
the speaker specifier specifies the speaker among the plurality of users by comparing the audio received by the audio receiver with audio of each of the plurality of users registered in advance in a storage unit.

7. The audio processing system according to claim 1, wherein
a camera is installed in each area, and
the speaker specifier specifies a direction from which the audio is received by the audio receiver, on the basis of a direction that a microphone of the audio processing device collected the audio, and specifies the speaker among the plurality of users on the basis of an image captured by the camera in the direction.

8. A conferencing system having an audio processing device and a display device placed in each of different areas, a plurality of users being present in each area, the conferencing system being capable of transmitting and receiving audio between the areas via the audio processing device, comprising:

a plurality of command storage areas that respectively correspond to a plurality of display devices;
an audio receiver that receives audio of a speaker from the audio processing device in a first area;
a speaker specifier that specifies the speaker among the plurality of users in the first area on the basis of the audio received by the audio receiver;
an audio determinator that determines, on the basis of the audio received by the audio receiver, whether or not a specified word for starting a reception of a predetermined command is included in the audio;
a command specifier that specifies, when the audio determinator determines that the specified word is included in the audio, a command on the basis of a command keyword which is included in the audio and follows the specified word;
a target user specifier that specifies, among the plurality of users in the first area on the basis of the content of the command specified by the command specifier, a target user with respect to which the command is to be executed; and
a command processor that stores information relating to the command specified by the command specifier in, among the plurality of command storage areas, a first command storage area that corresponds to a display device in the first area in which the target user specified by the target user specifier is present, wherein
each of the plurality of display devices includes a command executor that monitors one of the plurality of command storage areas that corresponds to a display device that includes the command executor itself, and
the command executor of the display device in the first area executes the command when the information relating to the command is stored in the first command storage area that corresponds to the display device that includes the command executor itself.

9. An audio processing method executed by one or more processors of an audio processing system comprising a plurality of terminal devices respectively placed in different areas, a plurality of audio processing devices respectively placed in the different areas, and a server connected to each of the plurality of terminal devices and the plurality of audio processing devices via a network, the server including a plurality of command storage areas respectively corresponding to the plurality of terminal devices, the audio processing method comprising:

receiving audio of a speaker from each of the plurality of audio processing devices;

specifying the speaker among a plurality of users who are respectively present in the different areas, on the basis of the received audio;

determining, on the basis of the received audio, whether or not a specified word for starting a reception of a predetermined command is included in the audio;

specifying, when it is determined that the specified word is included in the audio, a command on the basis of a command keyword which is included in the audio and follows the specified word;

specifying, among the plurality of users who are respectively present in the different areas, on the basis of the content of the specified command, a target user with respect to which the command is to be executed;

storing information relating to the specified command in one of the plurality of command storage areas that corresponds to one of the plurality of terminal devices that is placed in an area in which the specified target user is present, wherein each of the plurality of terminal devices includes a command executor that monitors one of the plurality of command storage areas that corresponds to a terminal device that includes the command executor itself; and executing, by the command executor, the specified command when the information relating to the specified command is stored in one of the plurality of command storage areas that corresponds to the terminal device that includes the command executor itself.

\* \* \* \* \*